March 25, 1952 L. E. ADLER 2,590,746

CONTROL SYSTEM FOR CARRIER TELECOMMUNICATION CIRCUITS

Filed Sept. 10, 1948 2 SHEETS—SHEET 1

INVENTOR
LEE E. ADLER
BY Ashley & Ashley
ATTORNEYS

March 25, 1952 L. E. ADLER 2,590,746

CONTROL SYSTEM FOR CARRIER TELECOMMUNICATION CIRCUITS

Filed Sept. 10, 1948 2 SHEETS—SHEET 2

INVENTOR.
Lee E. Adler

BY Ashley & Ashley

ATTORNEY

Patented Mar. 25, 1952

2,590,746

UNITED STATES PATENT OFFICE 2,590,746

CONTROL SYSTEM FOR CARRIER TELECOMMUNICATION CIRCUITS

Lee E. Adler, Dallas, Tex.

Application September 10, 1948, Serial No. 48,726

12 Claims. (Cl. 179—15)

Figure 1:
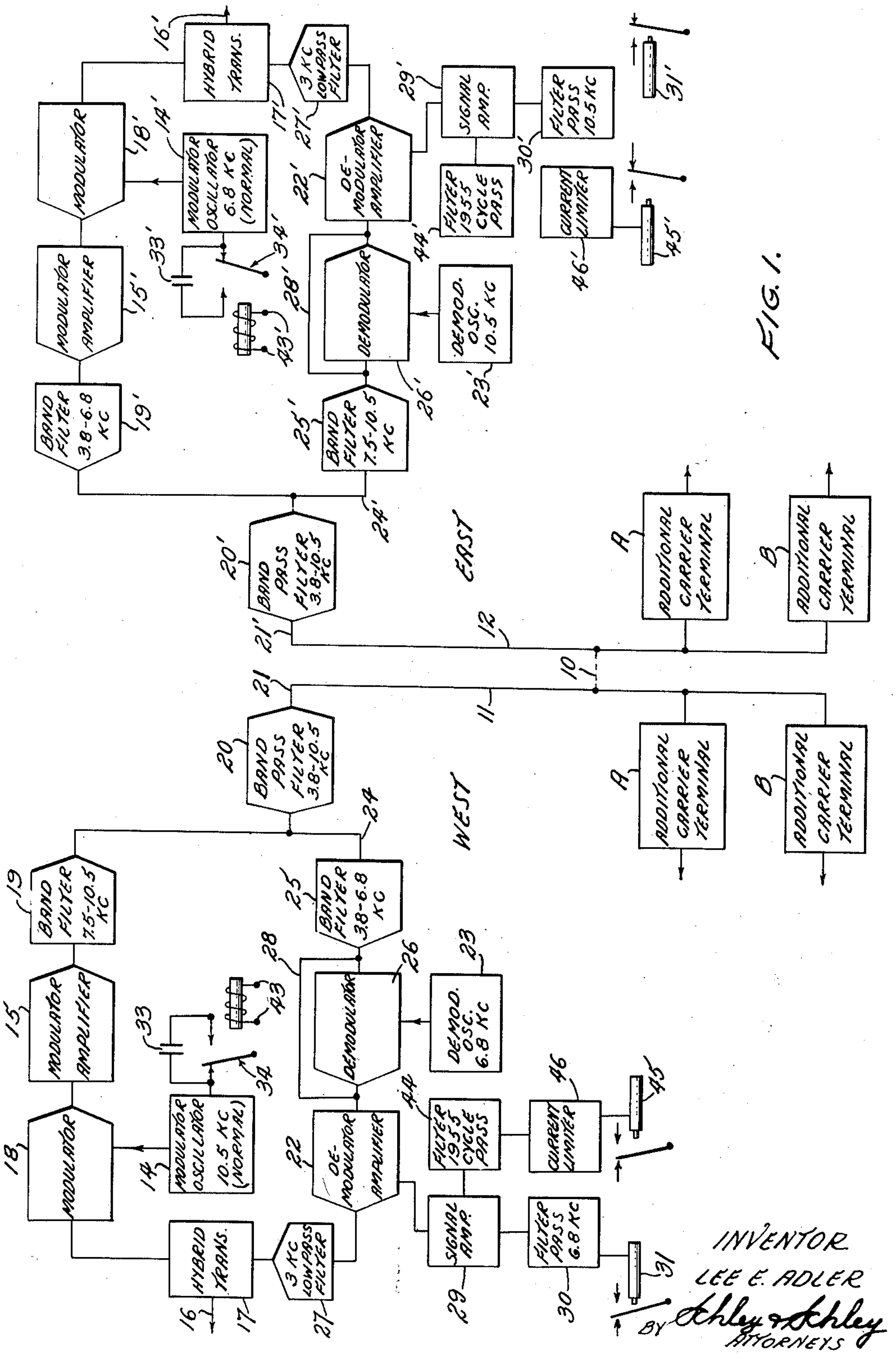

This invention relates to new and useful improvements in carrier systems.

The invention is particularly concerned with those types of suppressed carrier single-side-band systems and circuits which permit the impression of additional carrier frequeny channels upon so-called physical circuits so as to add additional communication channels over the same set of physical conductors. These systems are widely used in telephony and telegraphy, and in the control of various equipment such as railway signaling equipment and remote metering devices employed for the automatic control and operation of various measuring instrumentalities situated at a point some distance from the operator. This invention is also equally applicable to point-to-point radio-channel systems.

The presently available types of carrier systems are capable of providing several additional channels of communication over a single physical circuit or line. In general, these carriers operate by generating a selected carrier frequency upon which is impressed audible speech sounds or other intelligence by modulation of the carrier frequency. To establish a complete circuit, two such carrier channels are required for each communication channel or path since intelligence must be communicated from each end of the line to the other, and for the purposes of communicating speech sounds, a frequency band of the width of about twenty-five hundred to three thousand cycles is required for each channel. Such a width is necessary to include the range of the human voice and to retain intelligibility and recognition of such a voice. In addition, the individual bands or communication channels must be spaced apart over the available spectrum of frequencies so as to prevent overlapping with one another. The filters which separate the various frequency bands are by no means perfect, and allowance must be made for their indefinite selectivity at the margins of the band which they are adapted to handle. Coupled with these facts are the limitations upon the available spectrum of frequencies. It is not practical to transmit frequencies above thirty kilocycles over the ordinary physical circuit without the utilization of special conductors such as coaxial conductors or wave guides. The expense of such special types of conductors is prohibitive in most instances and thus limits ordinary communication channels to the spectrum below thirty kilocycles.

The net result of all of these factors is that not more than three or four two-way speech communication channels may be ordinarily provided within the available spectrum of conventional telephone lines without undue overlapping and interference between one channel and an adjacent channel. For example, with three such two-way communication channels, a total of six frequency bands is required to provide communication in both directions, and the substantially necessary and desirable spacing apart of these bands of approximately twenty-five hundred cycles apiece results in the utilization of almost the entire available spectrum of thirty kilocycles. Thus, the ordinary physical circuit between two remote points is limited to four channels of two-way communication, one carried at audio-frequency, and three carried at higher frequencies by means of the carrier system which includes a plurality of the usual type of carrier terminals.

It has been recognized to be desirable to enable a user of so-called toll, or long-distance communication lines to obtain or establish communication with a person in a remote locality simply by dialing the telephone number of the remotely located person. However, dialing procedure requires communication paths or channels other than the speech channel, since the calling and dialing signals must be transmitted in one direction, and the dial tone, ringing tone and/or busy tone normally obtaining in dial telephone systems, must be provided in the other direction. Obviously, it is possible to achieve this end by employing separate carrier terminals and frequencies for these various required communication paths, but to do so would not only require the installation of multiple sets of expensive equipment, but would further limit the number of additional circuits or communication channels which may be obtained over a single physical circuit. Some effort has also been made to achieve this end by blocking out a portion of the frequency band employed as a carrier, and to transmit the dialing and supervising information over this blocked-out band. The objection to the latter solution is that the blocked-out band must be at least a few hundred cycles in width, and the intelligibility and features of recognition of transmitted speech, with such a blocked-out portion excluded, are substantially reduced, if not lost.

One object of the present invention is to provide an improved carrier system which permits dialing and supervision operation within the band of the carrier channel being employed and without the exclusion or blocking out of any portion of such band.

A further object of the invention is to provide an improved carrier system which is particularly applicable to long-distance telephone operations, to railroad signaling equipment operation, and to the operation of remote metering equipment.

Yet another object of the invention is to provide an improved communication system which may be incorporated into the usual carrier terminal with very little alteration and the addition of very little equipment.

A pertinent object of the invention is to provide an improved communication system applicable to any type of communication path which makes available additional channels of communication within the frequency band employed by said system without any adverse effect upon the normal operation of said system.

A particular object of the invention is to increase the number of communication channels which may be employed within a given frequency spectrum.

A still further object of the invention is to provide an improved carrier system in which certain of the calling operations automatically alter the characteristics of the modulator oscillator to cause the same to generate a signal distinguishable from its normally generated signal, and thus provides an additional communication path within the frequency range normally encompassed by said oscillator.

Yet another object of the invention is to provide an improved carrier system which utilizes the provisions of the ordinary dial exchange equipment which is normally employed in the establishing of a connection between two dial-type telephones within a local exchange, to originate and terminate additional signaling circuits which permit the system to function between two dial exchanges in remote localities in much the same manner as dial telephone equipment in a local system.

A construction designed to carry out the invention will be hereinafter described together with other features of the invention.

Figure 2:
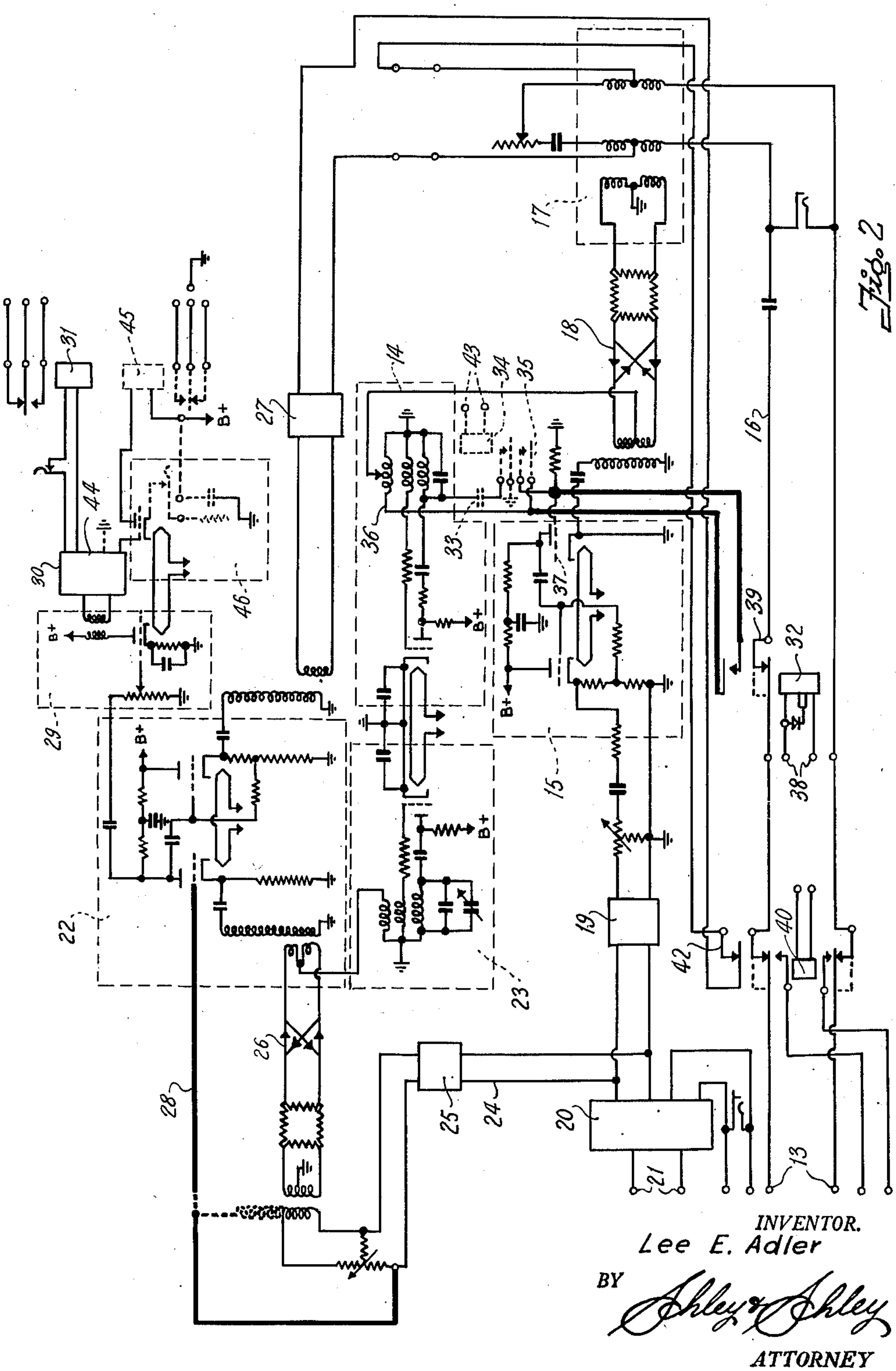

The invention will be more readily understood from a reading of the following specification and by reference to the accompanying drawings wherein examples of the invention are shown and wherein:

Fig. 1 is a diagrammatic view of the various elements employed in a carrier system arranged in accordance with this invention, and Fig. 2 is a wiring diagram of a carrier terminal constructed in accordance with this invention.

In the drawings, the numeral 10 designates a physical circuit extending between two remote points, such as two cities several hundred miles apart, and which normally includes a pair of electrical conductors (not shown) extending along poles to form a transmission line between said remote points. Of course, communication may be had over this physical circuit at audio-frequency by following the normal practices of telephony or telegraphy. At one end of the line 10, branch or connecting lines 11 and 12 are provided which are connected to the usual and ordinary equipment (not shown) for employing the physical circuit of the line 10. It is quite customary to also connect into the lines 11 and 12 a plurality of carrier systems so as to augment the communication channels available over or along the transmission line 10. Each of the carrier systems includes a pair of carrier terminals, one disposed at each end of the line 10, and for the purpose of illustration, the separating and line filters of each terminal have been employed to represent such terminal and are shown as connected into the lines 11 and 12. A pair of complete carrier terminals have been illustrated in the upper portion of Fig. 1 of the drawings, one terminal being labeled West and one being labeled East to designate the opposite ends of the transmission line 10. To save needless duplication, a second pair of carrier terminals have been indicated by the outlines lettered A, while a third pair has been indicated by the outlines lettered B. The branch lines 11 and 12 connect into each of the carrier terminals in accordance with the customary practice. Under established procedure, each pair of terminals represents a pair of communication channels which may be effectuated by means of the single transmission line 10.

The wiring diagram of a carrier system modified in accordance with this invention is illustrated in Fig. 2, said diagram comprising for the most part, a standard type of carrier system terminal. The terminal includes carrier drop connections 13, and the usual modulator oscillator 14, shown in Fig. 2 as enclosed more or less within a dotted line box. The modulator amplifier 15, also enclosed in a dotted box is associated with the modulator oscillator, and the two are suitably linked into the carrier drop circuit 16 through a hybrid transformer 17, enclosed within a dotted box, and a copper oxide type modulator 18. The output of the modulator amplifier 15 passes through a suitable band pass filter 19 and a separating and line filter 20 to the terminals 21 connecting into the physical transmission line 10, shown in Fig. 1.

Also, the usual demodulator amplifier 22, enclosed within a dotted outline box, is provided, along with the customary demodulator oscillator 23 also indicated in general by means of a dotted line box. A parallel circuit 24 leads from the line filter 20, passing through a demodulator band pass filter 25 and a copper oxide type demodulator 26 which is connected into the input of the demodulator amplifier 22. The audio-frequency output of the demodulator amplifier is conducted in the usual manner through a demodulator output filter 27, and through the hybrid transformer 17 back to the carrier drop terminals 13. This is the usual and ordinary arrangement of carrier terminals, and since it is familiar to persons skilled in the art, additional description need not be given.

The necessary additions to a standard terminal, conforming to this invention, have been illustrated by heavy solid lines in Fig. 2, and alternative additions thereto have been shown by heavy broken lines.

A conductor 28 by-passes the demodulator and passes into the demodulator amplifier 22. This latter circuit is adapted to carry a continuous wave of unaltered frequency transmitted from the remote terminal into the demodulator amplifier and thence into the signal amplifier 29 indicated by a dotted outlined box. The usual filter can carries a band pass filter 30 (Fig. 1) which will transmit the continuous wave of unaltered frequency and allow the same to pass to and actuate a relay 31, the terminals of which are connected into the usual linkage equipment for effecting ring down operation in the ordinary type of carrier terminal. The usual carrier terminal also includes a relay 32 suitably connected to the linkage equipment and actuated therefrom to cause the modulator oscillator to generate a continuous wave of unaltered frequency which is transmitted over the line 10 and eventually received at the relay of the far terminal.

The additions of the present invention include in general a means for detuning the modulator oscillator of each carrier terminal, and the addition of a suitable filter for passing the detuned carrier frequency signal into the linkages associated with each terminal to coact with the standard dial exchange equipment and provide additional signal or communication paths. One means for effecting the detuning of the modulator oscillator 14 is to connect a suitable tuned circuit element, such as a condenser 33, into the tuned circuit of the oscillator 14, and to interpose one pair of contacts of an additional relay 34 between the element 33 and ground. It is obvious that when the additional relay 34 is energized the frequency of the oscillator 14 will be altered by a predetermined amount through the addition of the element 33. A second pair of contacts 35 carried by the relay 34 are connected between the output of the oscillator 14 and the grid 37 of the modulator amplifier 15. The altered frequency signal of the oscillator 14 is thus transmitted to the terminals 21 and thence over the line 10 to the terminal at the far or remote location. The amount of alteration of the frequency of the oscillator 14 may be selected at any desired value so long as it is within the frequency band allotted to the particular carrier terminal at hand. Thus, if the terminal is operating upon a three thousand cycle band, the shift or alteration of the modulator oscillator output must be less than three thousand cycles. However, if wider or narrower bands are being employed, the degree of shift may be modified accordingly. It is also customary to filter out one side band of the carrier terminal signal, and it is obvious that the shift must be made in the direction opposite to that side band which is filtered out. In actual practice, a shift of 1955 cycles has proved quite satisfactory, but other frequency alterations of greater or lesser magnitude may be employed. Assuming a normal output frequency of 10.5 kilocycles for the modulator oscillator 14 and a shift of 1955 cycles, a continuous wave of 8545 cycles will now be generated. This signal passes through the filters 19 and 20 to the remote terminal and is there handled as will be described more fully hereinafter.

In the normal operation of a carrier terminal, impressing a suitable signal across the carrier drop, represented by the terminals 13, energizes the relay 32 closing its upper contacts to place the signal of the oscillator 14 upon the grid 37 of the modulator amplifier. The relays 32 and 34 function under the control of suitable linkages of well known types, to impose the output of the modulator oscillator 14 on the input grid 37 of the modulator amplifier 15, the difference being that the relay 34 also alters the frequency of the oscillator output. To effect this selective operation of the relay 34 in place of the relay 32, the coil terminals 38 of the latter relay 32 are disconnected from the carrier drop line 16, and one armature 39 of said relay is bridged so as to prevent the relay from interrupting the circuit through the lines 16. In the ordinary type of carrier terminal, the terminals 38 of the relay 32 are connected to the lines 16 for actuation when the carrier drop is closed. A twenty cycle ringing current relay 40 is also normally provided in a carrier terminal and functions to open the lines 16 and apply twenty cycle ringing current across the terminals 13. The armatures of the relay 40 are also bridged to prevent its opening of the line 16. It is not necessary to bridge the uppermost or third armature of this relay 42 which functions to interrupt the demodulated input to the hybrid transformer 17. The terminals 43 of the relay 34 are properly connected into the standard type of linkage so that the latter relay is operated through the standard linkage in place of the relay 32, and instead of the relay 32 functioning to cause the unaltered modulator oscillator output frequency to be transmitted to the remote terminal, the relay 34 will function to cause the shifted frequency output of the oscillator 14 to be so transmitted.

The structure illustrated in Fig. 2 which represents the west terminal, is reproduced substantially exactly at the east terminal, and such similarity between the two terminals is illustrated in Fig. 1. For all practical purposes, the only difference between the two units or terminals will amount to an exchange or transposing of the modulator and demodulator band pass filters and of the modulator and demodulator oscillators. This is necessary since one terminal transmits, for example, over frequency X and receives over frequency Y. Its paired terminal will transmit over frequency Y and receive over frequency X. Obviously, the band pass filters and the oscillators must be arranged in accordance with this necessary relationship. For the sake of convenience, and for conciseness, the wiring diagram of the eastern terminal has not been illustrated because it is substantially identical to the diagram of the western terminal. However, the system may be well illustrated by the block diagram shown in Fig. 1, it being understood that throughout, the various elements of the eastern terminal will be designated by the same numerals as like elements of the western terminal with a prime added so that Fig. 2 may be referred to as a wiring diagram of either terminal.

The altered or shifted frequency output of the western terminal modulator oscillator 14 is passed over the transmission line 10 to the line filter 20′ of the eastern terminal. This frequency can pass through the filter 25′ of said terminal, and is conducted from the latter filter to the demodulator 26′. In accordance with standard practice, this incoming signal is beat against the output frequency of the demodulator oscillator 23′ and the resulting sum and difference frequencies carried into the demodulator amplifier 22′. In the other type of applicant's carrier terminals, the supervisory signal emitted from the western terminal amounts to an unaltered continuous wave of the frequency of the modulator oscillator output of the latter terminal, and the frequency of the output of the demodulator oscillator 23′ of the eastern terminal is of exactly the same frequency. Thus, when the two frequencies are beat one against the other, the resultant difference is zero, while the sum of the frequencies is filtered out in accordance with standard practice. Thus, no signal passes directly from the demodulator 26′ into the amplifier 22′. However, the branch circuit 28′ is customarily employed, and this circuit serves to conduct the incoming continuous wave around the demodulator 26′, through a portion of the demodulator amplifier 22′ and into the signal amplifier 29′ from where the unaltered continuous wave signal passes through the filter 30′ which is normally arranged to pass a signal of such frequency. The signal then is transmitted to the relay 31' which operates to close circuits within the normal type of linkage and provide a twenty cycle ringing current or a supervision path of communication.

When it is desired to have dialing facilities, separate paths must be furnished or provided for dialing and for supervision. This problem is met in the ordinary dial telephone system, by reversing the polarity of the direct current supplied. However, when carrier terminals are being employed and alternating current is involved, such reversal of polarity is not possible and this expedient cannot be employed to obtain the additional signalling path required by the peculiarities of the ordinary type of linkage system.

In the present invention, the signalling path afforded by the unaltered continuous wave and the filter 30' is employed for dialing. A second signalling path is made available through the detuning of the modulator oscillator 14 to send out a signal from the western station or terminal of a lowered frequency. Upon this signal reaching the eastern station, it passes through the filter 25' and the demodulator 26' and beats upon the full frequency supplied by the demodulator oscillator 23'. Again, sum and difference frequencies result, and the sum frequency is filtered out in accordance with standard practice. The difference frequency will be of the value of the shift or alteration in frequency of the modulator oscillator 14 at the western station. Thus, if said oscillator is arranged to be detuned, or to have its output frequency altered, by 1955 cycles, the difference frequency passing through the demodulator 26' of the east station will be equal to said 1955 cycles. This signal passes through the demodulator amplifier 22', and through the filter 27' to the carrier drop 16' of the eastern terminal. However, since no connection has been made over the carrier drop 16' as yet, this signal has no effect.

The signal also passes through the signal amplifier 29', and into the filter 30'. The filter 30' will not pass anything but the full modulator oscillator signal, and hence does not pass the difference signal described. However, a second filter 44' is connected to signal amplifier 29', this filter being designed to pass the difference frequency. The signal thus flows through a different path from that of the full continuous wave signal, and passes into a suitable relay 45' by way of a current limiter 46'. The relay 45' functions to close a circuit within the usual type of linkage system and establishes communication with the dial exchange in the locality of the east terminal. The person calling at the west terminal now has established communication with the dial exchange at the east location simply by picking up his dial telephone at the western station. Of course, the local exchange at either station may make provision for the dialing of certain numbers to establish communication with various remote exchanges in the manner described when it is desired to have a plurality of such systems available. The additional filters 44 and 44' and relays 45 and 45', along with the current limiters 46 and 46', represent equipment which must be added to the prior type of carrier terminal in order to carry out the teaching of this invention, and it is thus seen that only two relays, a filter, a current limiter, and the frequency changing elements 33 and 33' must be added to an ordinary type of carrier terminal in order to convert it to dial operation. Of course, a few minor changes in wiring must be made, such as the bridging of armatures and the like.

Having established communication with the remote dial exchange or "seized the trunk" in said exchange, the caller at the west terminal may now proceed with the dialing of the local telephone number of the person being called at the east location. This is the same telephone number which a local subscriber at the east location would dial if he wished to obtain the person being called at said east location. As the caller at the west location dials the telephone number upon his telephone instrument, the linkage functions in the normal manner and conducts the interruption in current produced by the dialing operation to the coil of the relay 34, thereby causing said relay to intermittently open and close in accordance with the dialing impulses or interruptions. The fluctuations of the relay 34 result in like fluctuations of the altered frequency signal being produced by the oscillator 14, this signal being transmitted to the east terminal and there resulting in similar fluctuations of the relay 45'. In this manner, the dial impulses, or interruptions of current, are reproduced by the relay 45' in the dial exchange of the east location, and the mechanics of local dialing of the telephone number of the person being called at the east location, is substantially reproduced. It is obvious that the alternate procedure in which there is not an interruption of a continuous current but rather the application of intermittent pulses of current, may be followed at this point if so desired.

Before, during and after the dialing operation, the long distance caller at the western location receives the same supervisory information from the east terminal as would a person dialing over a local dial exchange. At the time communication was established with the east dial exchange, the east linkage functions to connect the carrier drop terminals of the east terminal into the dial system, and said system, in the usual manner, transmits dial, busy, ringing, and other supervisory signals to said carrier drop terminals. The audio-frequency signals thus impressed upon the east terminal are carried through the hybrid transformer 17', the modulator 18', and the amplifier 15' of the east terminal to be transmitted from the east terminal to the west terminal at the modulator frequency of said east terminal. In accordance with the usual practice, the output frequency of the east terminal is different from that of the west terminal, and for the purpose of illustration will be assumed to be 6800 cycles. This carrier frequency with its impressed or modulated intelligence is transmitted in the usual manner over the transmission line 10 to the west terminal, and is there received and demodulated in the normal manner and transmitted to the person calling. In this manner, all of the advantages, and all of the communication channels available in local dialing systems are made available in this long-distance dialing system.

When the person being called at the east location picks up his telephone, the relay of the east terminal equivalent to the relay 32 of the west terminal, is closed. It is to be noted throughout this description that the local dial exchanges and linkage systems function in substantially the same manner as when local calls are being made. This standard operation of presently existing equipment results in the actuation of the relay 32' of the east terminal rather than the relay 34' of said terminal because the linkage and dial exchange equipment have been shifted from normal position by reason of the incoming call. Thus, selected portions of the linkage equipment are employed to obtain this selective operation of the relay in the called locality.

The closing of the relay 32′ causes the modulator oscillator 14′ of the east terminal to send out an unaltered standing wave or signal which is transmitted to the west terminal and passed to the demodulator 26. As previously described, the beating of this full signal upon a like signal generated by the demodulator oscillator 23 of the west terminal, causes the cancelling out or nullifying of the effect of said signal insofar as the demodulator is concerned. However, the circuit 28 bypasses the incoming standing wave signal through the amplifier 22, the signal amplifier 29, and into the filter 30. The incoming signal, which will be 6800 cycles in the illustration given, cannot pass through the filter 44 of the west terminal, but it may pass through the filter 30 and actuate the relay 31. The closing of the relay 31 connects circuits within the west linkage system and causes the opening of the circuits leading to the terminals 43 of the relay 34 in the west terminal, thereby disconnecting the dialing path leading from the west terminal. The linkage system, in accordance with standard practice, is so arranged that the functioning of the relay 31 and the consequent action within the linkage results in the supplying of a momentary impulse of electric power to the coil of the relay 32, thus causing said relay to close and thereby momentarily close the relay 31′ at the east terminal. The momentary closing of the relays 32 and 31′ at both terminals releases all of the relays of the two terminals and places the same in condition for the carrying on of conversation. The calling and the called party may now converse in the usual manner, the audio-frequency input to each terminal being modulated and impressed upon a carrier frequency, which differs for each terminal, said modulated carrier signals being received and demodulated into audio-frequency signals at the opposite terminal.

Now, when either party hangs up his telephone, the dial linkage functions to momentarily close the relay 32 or 32′ of the terminal located adjacent the party hanging up. The closing of this relay operates the relay 31 or 31′ of the remote terminal, and through normal operation of the linkage system causes disconnection of both terminals and a return of the entire system to normal so as to be in condition to receive additional calls either incoming or outgoing.

Throughout this description, frequent reference has been made to dial exchange systems and to linkage systems. Neither of these systems have been illustrated or described since they are well-known and more or less standard in construction and arrangement. Neither does any more, or carries out any additional functions, when associated within the system of the present invention, than it does when used in conjunction with a local dial telephone system. No attempt has been made to explain the selective functioning of a linkage system in closing the different relays at different points in the calling procedure since to do so would needlessly complicate and burden the present application.

It is to be pointed out that this system may also be employed for the selective operation of remote equipment such as metering devices or railway signal equipment. The provision of additional communication channels permit the transmitting of distinguishable and separable signals to such equipment without necessitating additional physical circuits or the provision of additional carrier terminals. Broadly phrased the invention is concerned with any communication path in which the media of transmission are signals of an alternating or oscillating nature, and includes a shift of frequency of such signal within the confines of the channel at hand to provide a sub-channel within said channel which may be picked out and segregated for special purposes. It is also to be noted that carrier terminals may be originally constructed with the features of this invention incorporated therein, or such features may be added at will to a carrier terminal already in existence.

The foregoing description of the invention is explanatory thereof and various changes in the size, shape and materials, as well as in the details of the illustrated construction may be made, within the scope of the appended claims, without departing from the spirit of the invention.

What I claim and desire by Letters Patent is:

1. In a normally suppressed two-way carrier system having an assigned frequency band for signalling in one direction and a different assigned frequency band for signalling in the opposite direction, and providing a plurality of auxiliary signalling channels within each of said frequency bands; a carrier terminal including: a transmitting circuit comprising an output circuit, a carrier frequency oscillator having a tuned circuit, a modulator interposed between said oscillator and output circuit, switching means for supplying the frequency of said oscillator to said modulator, and a modifying circuit for said tuned circuit comprising switching means for supplying to said modulator a frequency differing from said carrier frequency by a value less than one of said assigned frequency bands; a receiving circuit comprising an input circuit, a demodulator oscillator generating a frequency differing from said carrier frequency by not less than the width of one of said bands, a demodulator interposed between said demodulator oscillator and input circuit, a demodulator output circuit, selective filters in said output circuit, and signal responsive devices connected with said filters respectively.

2. In a carrier communication system, a carrier terminal comprising a demodulator having input and output circuits providing multiple channels for voice and switching signals, a constant frequency oscillator in circuit with said demodulator superimposing its frequency upon incoming voice signals to produce voice audio frequencies in said output circuit and superimposing its frequency upon incoming switching signals to produce a switching audio frequency in said output circuit, coupling means interconnecting said demodulator input and output circuits providing a path for incoming switching signals of carrier frequency, voice and switching signal receiving devices connected with said output circuit, and selective filter means in said output circuit distributing said voice and switching signals to their respective devices.

3. In a normally suppressed two-way carrier system having an assigned frequency band for signalling in one direction and a different assigned frequency band for signalling in the opposite direction, and providing a plurality of auxiliary signalling channels within each of said frequency bands; a transmitting circuit comprising an output circuit, a carrier frequency oscillator having a tuned circuit, a modulator interposed between said oscillator and output circuit, switching means for applying the frequency of said oscillator to said modulator, and a modifying circuit for said tuned circuit comprising switching means for applying to said modulator a frequency differing from said carrier frequency by a value less than one of said assigned frequency bands; a receiving circuit comprising an input circuit coupled with said output circuit, a demodulator oscillator generating a frequency equal to said carrier frequency, a demodulator interposed between said demodulator oscillator and input circuit, a demodulator output circuit, selective filters in said output circuit, and signal responsive devices connected with said filters respectively.

4. In a normally suppressed two-way carrier system having an assigned frequency band for signalling in one direction and a different assigned frequency band for signalling in the opposite direction, and providing a plurality of auxiliary signalling channels within each of said frequency bands; a carrier terminal including: a transmitting circuit, a modulator connected in said transmitting circuit, carrier frequency oscillator means producing alternate frequencies for cooperation with said transmitting circuit, switching means selectively connecting said oscillator means to said transmitting circuit for application of one of said frequencies, said frequencies differing from one another by a value less than one of said assigned frequency bands; a receiving circuit comprising an input circuit, a demodulator oscillator generating a frequency differing from one of said carrier frequencies by not less than the width of one of said bands, a demodulator interposed between said demodulator oscillator and input circuit, a demodulator output circuit, selective filters in said output circuit, and signal responsive devices connected with said filters respectively.

5. In a carrier communication system, a plurality of terminal stations, a transmission line connecting said stations, oscillator means located at a first of said stations for generating a carrier frequency in circuit with said line for transmission to a second of said stations, oscillator means at said second station for generating a second carrier frequency in circuit with said line for transmission to said first station, switching means at said stations in circuit with their respective oscillators for modifying the frequencies of their respective oscillators to predetermined values, selective receiving filters in circuit with said line at each of said stations tuned to pass the modified oscillator frequency of the other, selective receiving filters in circuit with said line at each of said stations tuned to pass the unmodified oscillator frequency of the other, and a signalling relay connected to the output of each of said filters for operating a signalling circuit.

6. In a communication system, a plurality of intercommunicating stations, means electrically interconnecting said stations, a signal generator at a first of said stations in circuit with said interconnecting means and having a normal output signal of a predetermined constant frequency, means in circuit with said generator for modifying said signal to a second predetermined constant frequency, a signal receiver at a second of said stations in circuit with said interconnecting means and having an output circuit, a plurality of selective filters connected to said output circuit, one of said filters accepting the first said frequency and rejecting the second, another of said filters accepting the second said frequency and rejecting the first, and a plurality of signalling relays connected with the output circuits of said filters respectively.

7. In a communication system, a plurality of intercommunicating stations, means electrically interconnecting said stations, a signal generator at a first of said stations in circuit with said interconnecting means and having a normal output signal of a predetermined constant frequency, subscriber responsive switching means in circuit with said generator for modifying said signal to a second predetermined constant frequency, a signal receiver at a second of said stations in circuit with said interconnecting means and having an output circuit, a plurality of selective filters connected to said output circuit, one of said filters accepting the first said frequency and rejecting the second, another of said filters accepting the second said frequency and rejecting the first, and a plurality of signalling relays connected with the output circuits of said filters respectively.

8. In a communication system, a plurality of intercommunicating stations, means electrically interconnecting said stations, a signal generator at a first of said stations in circuit with said interconnecting means and having a normal output signal of a predetermined constant frequency, means including a reactance in circuit with said generator for modifying said signal to a second predetermined constant frequency, a signal receiver at a second of said stations in circuit with said interconnecting means and having an output circuit, a plurality of selective filters connected to said output circuit, one of said filters accepting the first said frequency and rejecting the second, another of said filters accepting the second said frequency and rejecting the first, and a plurality of signalling relays connected with the output circuits of said filters respectively.

9. In a communication system, a plurality of intercommunicating stations, means electrically interconnecting said stations, a modulator and an oscillator at a first of said stations in circuit with said interconnecting means, said oscillator having a normal output signal of a predetermined constant frequency, means in circuit with said generator for modifying said signal to a second predetermined constant frequency, a demodulator at a second of said stations in circuit with said interconnecting means and having an output circuit, a plurality of selective filters connected to said output circuit, one of said filters accepting the first said frequency and rejecting the second, another of said filters accepting the second said frequency and rejecting the first, and a plurality of signalling relays connected with the output circuits of said filters respectively.

10. In a suppressed carrier single-side-band communication system, at least one pair of intercommunicating matched carrier terminals, means electrically interconnecting said terminals, each terminal including a modulator oscillator in circuit with said interconnecting means and having a normal output signal of a predetermined constant frequency different from the modulator oscillator frequency of its matching terminal, means in circuit with each modulator oscillator for modifying said signal to a second predetermined constant frequency, a signal receiver at each of said matching terminals in circuit with said interconnecting means and having an output circuit, a plurality of selective filters connected to said output circuit, one of said filters accepting the first said frequency and rejecting the second, another of said filters accepting the second said frequency and rejecting the first, and a plurality of signalling relays connected with the output circuits of said filters respectively.

11. In a suppressed carrier single-side-band communication system having a transmission medium electrically interconnecting at least two carrier terminals; each of said carrier terminals operating on respectively different carrier frequencies for transmission to and from said medium, each of said terminals having a local oscillator in circuit with said transmission medium generating a normal operating carrier frequency, means provided at each of said terminals in circuit with its local oscillator for changing its carrier frequency to a second value, selective filters in circuit with said transmission medium included at each of said terminals accepting each of said frequencies of another of said terminals to the exclusion of the other, and relays connected with said filter circuits operative in response to said frequencies respectively.

12. In a suppressed carrier single-side-band communication system having a transmission medium electrically interconnecting at least one pair of matched carrier terminals; each of said carrier terminals operating on respectively different carrier frequencies for transmission to and from said medium, each of said terminals having an oscillator in circuit with said transmission medium generating a normal operating carrier frequency, subscriber controlled reactance means in circuit with its respective oscillator provided at each of said terminals for changing its carrier frequency to a second value, demodulator and filter circuits included at each of said terminals in circuit with said transmission medium, each of said filter circuits accepting one of said frequencies of another of said terminals to the exclusion of the other, one of said filter circuits bypassing said demodulator, and relays connected with said filter circuits operative in response to said frequencies respectively.

LEE E. ADLER.

REFERENCES CITED

The following references are of record in the file of this patent:

UNITED STATES PATENTS

| Number | Name | Date |
|---|---|---|
| 1,481,831 | Demarest | Jan. 29, 1924 |
| 1,592,940 | Kendall | July 20, 1926 |
| 1,762,984 | Heising | June 10, 1930 |
| 1,811,839 | Arnold | June 30, 1931 |
| 1,816,905 | Horton | Aug. 4, 1931 |
| 1,896,487 | Gibson | Feb. 7, 1933 |
| 2,014,081 | Csepely | Sept. 10, 1935 |
| 2,064,907 | Green | Dec. 22, 1936 |
| 2,064,958 | Taylor | Dec. 22, 1936 |
| 2,295,153 | Bjornson | Sept. 8, 1942 |
| 2,388,001 | Loughren | Oct. 30, 1945 |
| 2,408,085 | Meacham | Sept. 24, 1946 |
| 2,429,607 | Capen | Oct. 28, 1947 |
| 2,438,903 | Deloraine et al. | Apr. 6, 1948 |
| 2,440,239 | Almquist | Apr. 27, 1948 |
| 2,457,434 | Bartelink | Dec. 28, 1948 |
| 2,484,680 | Bossart | Oct. 11, 1949 |